Aug. 8, 1939.   P. L. SCOTT   2,168,631
PLUMBING FITTING
Filed Aug. 19, 1935

Inventor
Philip L. Scott
by Parker + Carter
Attorneys.

Patented Aug. 8, 1939

2,168,631

UNITED STATES PATENT OFFICE 2,168,631

PLUMBING FITTING

Philip Lane Scott, Chicago, Ill., assignor to Super Diesel Tractor Corporation, La Porte, Ind., a corporation of New York Application August 19, 1935, Serial No. 36,881

5 Claims. (Cl. 285—197)

This invention relates to means for joining tubing and more particularly to means for joining thin walled tubing where the use of threads is undesirable or impracticable.

One object of the invention is to provide a simple joint which will not require a soldering or brazing operation or a threading operation.

Another object is to provide a joining device which will avoid separate threaded members.

Another object is to provide a device which may be readily used in the field, to make a satisfactory joint.

The invention is illustrated more or less diagrammatically in the accompanying drawing, wherein.

Like parts are designated by like characters throughout.

1 designates an end of a portion of thin walled tubing. 2 is another end portion of thin walled tubing. 3 is a tubular double tapered connecting piece, which has a circumferential groove at 4, and feather edges at 5, 5. The ends of the tubes 1 and 2 are rolled into this groove as shown at 6, 6. The connecting piece 3 has a bore 7.

Figure 1:
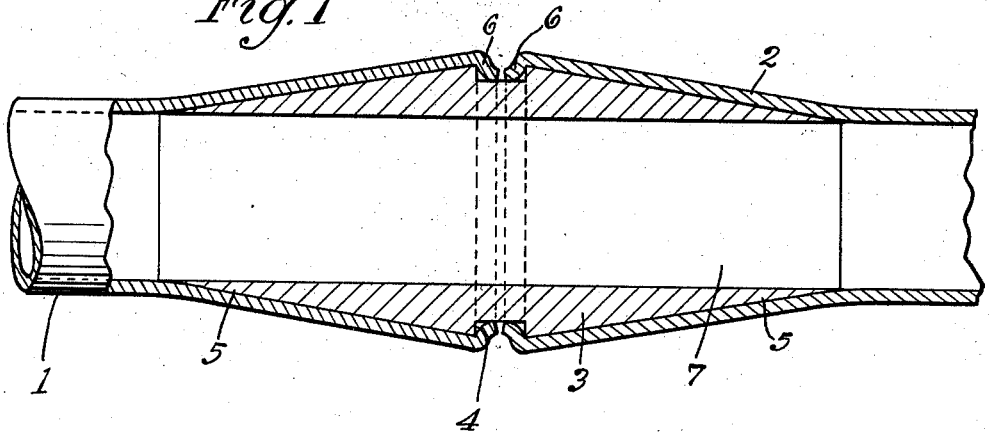
Figure 1 is a cross section of a joint between two tube ends formed according to this invention.
Figure 2:
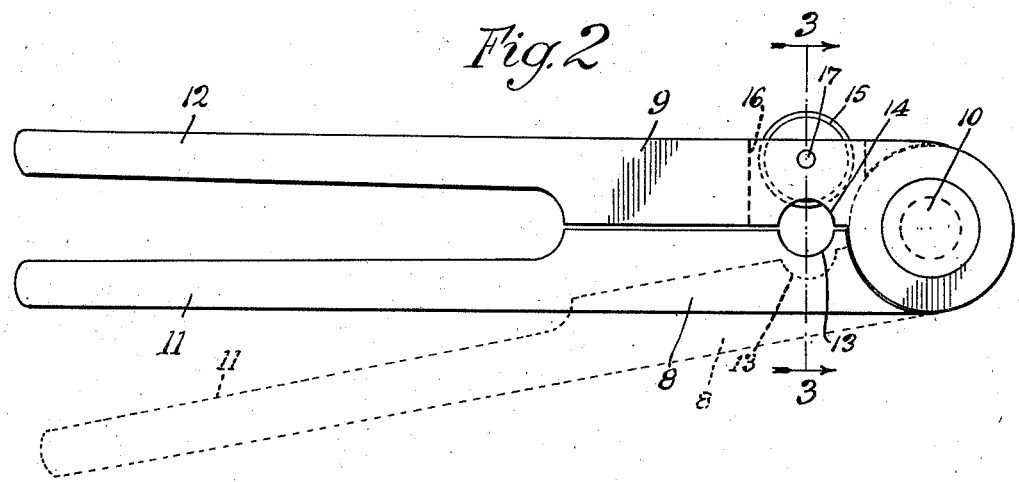
Figure 2 is an elevation of the tool used to form such a joint.
Figure 3:
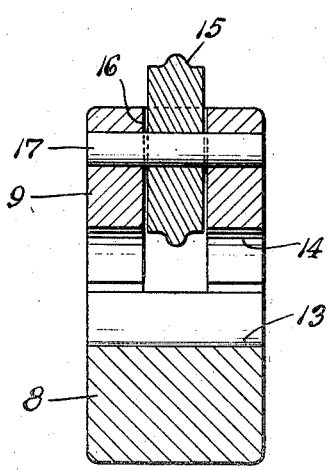
Figure 3 is a section taken at line 3—3 of Figure 2, on an enlarged scale.

In Figure 2, 8 and 9 are two jaws of a tool somewhat similar to an ordinary lineman's pliers or tongs, jointed at 10 and having handle extensions 11 and 12. The member 8 has a semi-circular groove 13 and the member 9 a semi-circular groove 14, into which the edge of a roller wheel 15 projects. The roller wheel 15 is mounted in a slot 16 cut in 9, and on the pin 17.

Heretofore the problem of joining thin walled tubing has been solved by the use of separate threaded connecting members with or without external thimbles, or by brazing, soldering, or by welding, since the cutting of threads is either difficult or impractical in such tubing. Such connections have either proved relatively costly or have been difficult to handle in the field, or have proven unsatisfactory where vibration existed. The purpose of this invention is to overcome these various objections. This is accomplished by providing a tubular connecting piece or sleeve tapered from the center toward a feather edge at both ends, and having a circumferential groove cut in the center. This tube or sleeve requires merely two operations with simple tools to form a permanent joint of small increased diameter, and uniform bore with respect to the bore of the tubing. In practice this joint is made as follows.

A taper drift of the same taper as that of the sleeve is driven into the ends of the tubes to be joined. Thin walled tubing of brass or copper will expand sufficiently without difficulty as will soft steel, but in some cases it may be necessary to anneal a hard material used for such tubing.

After the tube ends have been expanded to a little more than the major diameter of the sleeve, the sleeve is inserted in one tube end and the other tube end brought up upon the sleeve snugly. The ends of the tubes, which will obviously overlap the edges of the grooves slightly since the diameter is slightly greater than the sleeve diameter, are then rolled in to the groove by means of the tool shown in Figure 2. The lower half of the tool 8 supports the tubes in the semi-circular groove 13 which is slightly larger than the diameter to be rolled. The wheel 15 which projects slightly into the mating groove 14 in the upper half of the tool extends below the diameter to be rolled and will therefore force the lips of the tubes into the groove.

In forcing the lip of the tube into the groove it will be seen that there is a tendency to further draw up the tubes snugly upon the taper.

In tubing which carries a fluid under moderate pressures, a seal is produced at the feather edges 5, 5, which, being very thin, will expand outwardly against the tubes 1, 2, due to the internal pressure. Sealing also occurs along the tapered surfaces and at the edges of the groove 4 where the tube lips are rolled over as at 6, 6, regardless of pressure.

It is of course obvious that this type of joint need not be used to join two tubes but may join a tube to some other member provided the other member has a projection which corresponds in form to the tapered sleeve.

It is to be understood that a wide variety of modifications may be made in proportions and dimensions without departing from the spirit of the invention.

I claim:

1. A connector for metallic tubing comprising a double exteriorly tapered sleeve having approximately the same interior diameter as that of the said tubing and provided with a groove positioned substantially at its middle and formed in its exterior, and having a feather edge at one end said edge expanding under internal pressure effect a seal.

2. A connector for thin walled metallic tubing comprising a double exteriorly tapered metallic sleeve having approximately the same interior diameter as that of the said tubing and provided adjacent its center with a circumferential groove formed in its exterior and having a feather edge at each end said edge expanding under internal pressure to effect a seal.

3. In a tubing joint, an expanded tube end, an exteriorly tapered member provided with an exterior depression, said tapered member adapted to mate with the expanded tube end and having a feather edge at one end and a depressed end portion of the tube extending into and seizing the said depression, in said tapered member.

4. In a tubing joint, an expanded metallic tube end, an exteriorly tapered member provided with an exterior groove at its largest diameter, said tapered member adapted to mate with the expanded tube end, and having a feather edge at one end, and a depressed end portion of the tube extending into and seizing the groove, said feathered end expanding under internal pressure to effect a seal.

5. In a thin walled tubing joint, an expanded tube end, a tapered member provided with an exterior groove at its largest diameter, said tapered member adapted to mate with the expanded tube end, and having a feather edge at each end, and a depressed portion of the tube extending into and seizing the said groove.

PHILIP LANE SCOTT.